United States Patent [19]

Schulenberg

[11] 3,728,388
[45] Apr. 17, 1973

[54] 1-AMINO-2,3-DISUBSTITUTED CYCLOPROPENYLIUM SALTS

[75] Inventor: John W. Schulenberg, Bethlehem, N.Y.

[73] Assignee: Sterling Drug Inc., New York, N.Y.

[22] Filed: Aug. 10, 1970

[21] Appl. No.: 62,618

[52] U.S. Cl............260/563 P, 260/239 B, 260/247, 260/293 A, 260/340.5, 260/463, 260/468 R, 260/556 R, 260/583 R, 260/611 B, 260/666 M, 260/668 F, 260/733.3, 424/244, 424/325, 424/331
[51] Int. Cl..............................................C07c 87/40
[58] Field of Search ..........................260/563 P, 468

[56] References Cited

OTHER PUBLICATIONS

Fochlisch et al., "Chem. Abstracts" Vol. 63 (1965) p. 9825f

*Primary Examiner*—Lewis Gotts
*Assistant Examiner*—D. R. Phillips
*Attorney*—Elmer J. Lawson, B. Woodrow Wyatt, Thomas L. Johnson, Robert K. Bair, William G. Webb, Frederik W. Stonner, Roger T. Wolfe and Lynn T. Fletcher

[57] ABSTRACT 1,2,3-Trisubstituted-cyclopropenylium salts having antibacterial and antiviral activity and prepared either by reaction of a 2,3-disubstituted-cyclopropenone with a trialkyloxonium tetrafluoroborate followed by reaction of the resulting 1-alkoxycyclopropenylium tetrafluoroborate with an amine or by reacton of a 2,3-disubstituted-cyclopropenone with an organo metallic compound followed by treatment of the resulting carbinol with a strong acid.

13 Claims, No Drawings

1-AMINO-2,3-DISUBSTITUTED CYCLOPROPENYLIUM SALTS

This invention relates to novel chemical compositions known in the art of chemistry as 1,2,3-trisubstituted-cyclopropenylium salts, and having the formulas:

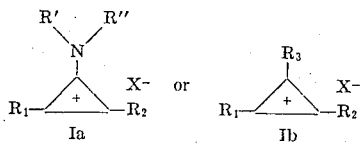

where $R_1$ and $R_2$ are each, i.e. independently of one another, t-butyl or 1-adamantyl; $R_3$ is 1-adamantyl-lower-alkyl, phenyl, or 1-adamantyl; $R'$ and $R''$ are each hydrogen or lower-alkyl, or $R'$ is hydrogen and $R''$ is lower-alkyl, phenyl, phenyl-lower-alkyl, 1- or 2-adamantyl, 2-benzyloxyethyl, cycloalkyl, carbamyl (—$NHCONH_2$), thiocarbamyl (—$NHCSNH_2$), or phenylamino, or $R'$ is lower-alkyl and $R''$ is 1- or 2-adamantyl, or $R'$ and $R''$ together with the nitrogen atom to which they are attached form a heterocyclic ring selected from the group consisting of 1-morpholino and polymethyleneimino having from two to six ring carbon atoms; and $X^-$ is an anion of a strong acid.

As used herein the term "lower-alkyl" means saturated, monovalent aliphatic radicals, including straight or branched-chain radicals, of from one to six carbon atoms, as illustrated by, but not limited to, methyl, ethyl, propyl, isopropyl, butyl, amyl, hexyl, and the like.

As used herein, the term "cycloalkyl" means saturated carbocyclic groups having from three to seven ring carbon atoms and having up to ten total carbon atoms, as illustrated by, but not limited to, cyclopropyl, 2-methylcyclopropyl, cyclobutyl, cyclohexyl, 3-ethylcyclopentyl, 2,5-dimethylcyclohexyl, and cycloheptyl.

When $R'$ and $R''$ together with the amino nitrogen atom is polymethyleneimino having from two to six ring carbon atoms, the latter can contain up to a total of ten carbon atoms and thus represents, inter alia, 1-aziridino, 2-methylaziridino, 1-azetidino, 1-pyrrolidino, 1-piperidino, 2,4,6-trimethylpiperidino, or 1-hexamethyleneimino.

The anions represented by the group $X^-$ in the compounds of formulas $Ia$ and $Ib$ are in themselves neither novel nor critical, and can be any anion of a strong inorganic or organic acid, such as bromide, chloride, iodide, sulfate, tetrafluoroborate, perchlorate, p-toluenesulfonate, or methanesulfonate.

Moreover in the compounds of formulas $Ia$ and $Ib$ where $R_3$ or $R''$ include a phenyl-bearing radical, that is where $R_3$ is phenyl or where $R''$ is phenyl, phenyl-lower-alkyl, 2-benzyloxyethyl, or phenylamino, the benzene ring of the phenyl-bearing moiety can be unsubstituted or can be substituted by methylenedioxy or ethylenedioxy or by from one to three members of the group consisting of halogen, lower-alkyl, lower-alkoxy, lower-alkylmercapto, or di-lower-alkylamino.

The compounds of formula $Ia$ where $X^-$ is the tetrafluoroborate anion are prepared by reaction of a 2,3-disubstituted-cyclopropenone of formula II with a tri-lower-alkyloxonium tetrafluoroborate (Meerwein's reagent) and treatment of the resulting 1-lower-alkoxy-2,3-disubstituted-cyclopropenylium tetrafluoroborate with an appropriate amine. The method is represented by the equations:

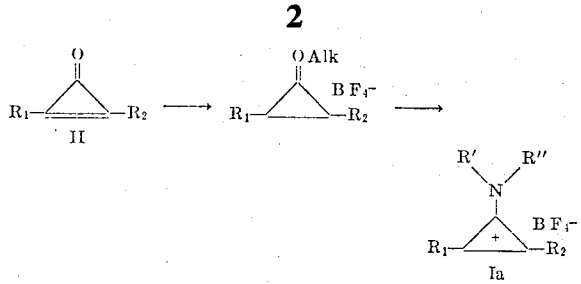

where $R_1$, $R_2$, $R'$, and $R''$ have the meanings indicated above, and Alk is lower-alkyl. The reaction is carried out in an organic solvent inert under the conditions of the reaction, for example methylene dichloride, ethylene dichloride, chloroform, and the like, and at temperatures in the range from about 0°C. to about 40°C. The products either precipitate from the reaction medium directly and can be isolated by filtration, or they are caused to precipitate by dilution of the reaction mixture with diethyl ether.

The compounds of formula $Ia$ where $R'$ is hydrogen and $R''$ is carbamyl or thiocarbamyl are prepared by reaction of a 2,3-disubstituted-cyclopropenone of formula II with either semicarbazide or thiosemicarbazide in an organic solvent inert under the conditions of the reaction, preferably a lower-alkanol such as methanol, ethanol, or isopropanol and in the presence of a strong acid, HX, preferably at the boiling point of the solvent.

The compounds of formula $Ib$ are prepared by reaction of a 2,3-disubstituted-cyclopropenone of formula II with an organo lithium compound ($R_3Li$) or an organo magnesium halide ($R_3MgX$), followed by treatment of the resulting carbinol with a strong acid (HX) as illustrated by the following equations:

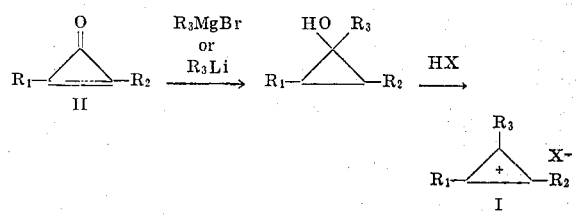

where $R_1$, $R_2$, $R_3$, and $X^-$ have the meanings given above. The reaction is carried out at a temperature in the range from about −10° to about 30°C. and in an organic solvent inert under the conditions of the reaction, for example diethyl ether, tetrahydrofuran, benzene, or mixtures of these solvents.

The 2,3-disubstituted-cyclopropenones of formula II are in turn prepared by reaction of a substituted acetyl halide of the formula $R_1CH_2COX$ with an appropriate Grignard reagent of the formula $R_2CH_2MgCl$ where $R_1$ and $R_2$ have the meanings given above and X is chlorine or bromine; bromination of the resulting 1,3-disubstituted-2-propanone to prepare the corresponding 1,3-dibromo-1,3-disubstituted-2-propanones; and treatment of the dibromopropanones with a strong organic base such as 1,5-diazabicyclo[5.4.0]undec-5-ene (DBU) or 1,5-diazabicyclo[4.3.0]non-5-ene (DBN). The procedure is illustrated by the equations:

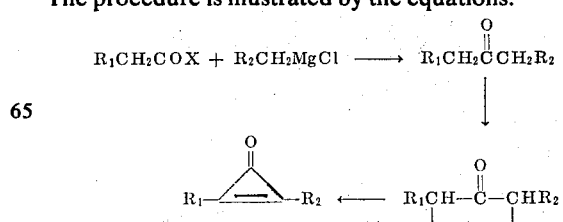

where $R_1$, $R_2$, and X have the meanings given above.

The instant invention also contemplates compounds having the formulas III and IV:

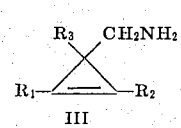 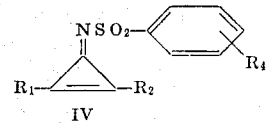

where, in the compounds of formula III, $R_1$, $R_2$, and $R_3$ are identical lower-alkyl groups, and where in formula IV, $R_4$ is hydrogen, lower-alkyl, halogen, or lower-alkoxy; and $R_1$ and $R_2$ have the meanings given above. The compounds of formulas III and IV are useful as antibacterial agents.

The compounds of formula III are prepared by reaction of compounds corresponding to formula Ib where $R_1$, $R_2$, and $R_3$ are lower-alkyl (e.g. isopropyl, t-butyl, neopentyl, etc.) with an alkali metal cyanide, and alkali metal aluminum hydride reduction of the resulting 1,2,3-trisubstituted-cyclopropene-1-carbonitrile as represented by the equations:

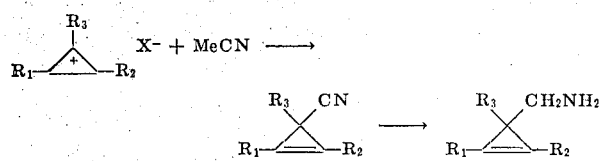

where $R_1$, $R_2$, and $R_3$ have the meanings given above, and Me represents an alkali metal. The reaction of the cyclopropenylium salt of formula Ib with the alkali metal cyanide is carried out in an organic solvent, such as acetonitrile, acetone, methanol, ethanol, isopropanol and the like, at the boiling point thereof. The reduction of the carbonitrile is advantageously carried out in diethyl ether or tetrahydrofuran at temperatures from around 0°C. up to the boiling point of the solvent used.

The compounds of formula IV are prepared by reacting a compound of formula II with a benzenesulfonyl isocyanate in an organic solvent inert under the conditions of the reaction, for example, methylene dichloride, chloroform, ethylene dichloride, benzene, and the like.

As indicated above, the acid anion represented by $X^-$ is not a critical feature of the invention and can be any anion of a strong acid such as those exemplified above. Therefore, if desired a particular salt species may be converted to another species having a different anion by use of various ion exchange procedures, for example by passing a solution of the salt over an appropriate ion exchange column.

The compounds of formulas Ia, Ib, II, III, and IV have been found to possess antibacterial activity, and the compounds of formulas Ia and Ib, in addition, have been found to posses antiviral activity against Asian $A_2$ variant, Japanese$_{170}$ strain of influenza virus and against Influenza$_B$, Maryland strain virus, thus indicating usefulness of the compounds of formulas Ia and Ib as antibacterial and antiviral agents, and the compounds of formulas II, III, and IV as antibacterial agents. The compounds of formula II are of course additionally useful as intermediates for the preparation of the compounds of formulas Ia and Ib as described above.

The antibacterial activity was determined using a modification of the Autotiter method described by Goss et al., Applied Microbiology, 16 (No. 9), 1414–1416 (1968) in which a 1000 mcg./ml. solution of the test compound is prepared. To the first cup of the Autotray is added 0.1 ml. of the test solution. Activation of the Autotiter initiates a sequence of operations by which 0.05 ml. of the test compound solution is withdrawn from this cup by a Microtiter transfer loop and diluted in 0.05 ml. of sterile semisynthetic medium (glucose). After this operation, 0.05 ml. of inoculated semi-synthetic medium is added automatically to each cup. The overall operation results in final drug concentrations ranging from 500 to 0.06 mcg./ml. in twofold decrements. The Autotray is incubated for 18–20 hours at 37°C., at which time the trays are examined visually for growth as evidence by turbidity, and the concentration of the last sample in the series showing no growth (or no turbidity) is recorded as the minimal inhibitory concentration (MIC). The compounds of formulas Ia, Ib, II, III, and IV were thus found to be antibacterially effective against Staphylococcus aureus, Pseudomonas aeruginosa, Escherichia coli, and Proteus vulgaris at concentrations from 3.1 to 500 mcg./ml.

The anti-influenza-viral activity of the compounds was determined in mice in a lung inflammation test which is described as follows: Each of a group of 10 female Swiss mice weighing 12–15 g. is medicated subcutaneously with the test compound twice daily for 5 consecutive days. Twenty animals are maintained as non-medicated infected controls and twenty others as normal non-infected controls. On the second day of medication, each animal is infected by intranasal administration of approximately one $LD_{50}$ of a strain of influenza virus (maintained as a suspension of infected mouse lung in sterile tryptose phosphate broth) in a volume of 0.05 ml. One $LD_{50}$ of influenza virus under the conditions of the experiment produces approximately a two-fold increase in average lung weight. On the sixth day after infection, all animals are anesthetized by intraperitoneal administration of sodium pentobarbital, the animals sacrificed, and the lungs excised and weighed to the nearest milligram. Statistical treatment of differences of lung weight between treated mice and infected non-medicated controls by the Mann-Whitney U Test results in probability values ($p$ value), and the compounds were considered active or inactive according to whether the $p$ value is $<.01$ or $>.05$, respectively.

In use, the compounds can be formulated by preparing a dilute solution in an aqueous medium or in a solution containing a surfactant, or alternatively in an organic medium in which the compounds are soluble, for example ethyl alcohol, and are applied to a surface to be disinfected by conventional means such as spraying, swabbing, immersion, and the like. Alternatively the compounds can be formulated as ointments or creams by incorporating them in conventional ointment or cream bases, for example alkylpolyether alcohols, cetyl alcohol, stearyl alcohol, and the like, or as jellies by incorporating them in conventional jelly bases as glycerol and tragacanth. They can also be formulated for use as aerosol sprays or foams.

The molecular structures of the compounds of my invention were assigned on the basis of study of their infrared, ultraviolet, and NMR spectra, and confirmed by the correspondence between calculated and found values for the elementary analyses for representative examples.

The following examples will further illustrate the invention without, however, limiting it thereto.

EXAMPLE 1

A. 2,3-Di-t-butylcyclopropenone

To a mixture of 12 g. (0.50 g. atom) of magnesium turnings in dry ether was added about half of a solution containing 48.2 g. (0.45 mole) of neopentyl chloride in 300 ml. of dry ether. The reaction was started by addition of a few drops of ethyl bromide and by crushing the magnesium turnings with a glass rod, and when the reaction had begun, the remaining portion of the neopentyl chloride solution was added in portions over a period of about an 1½. The reaction mixture was stirred and refluxed overnight, and then cooled in an ice bath, treated dropwise over a period of about two hours with a solution of 48.6 g. (0.36 mole) of t-butylacetyl chloride in 150 ml. of absolute ether, and then refluxed for an additional 2 hours, after which it was cooled in an ice bath, treated dropwise with 50 ml. of water, then with 50 ml. of 6N hydrochloric acid, and stirred for fifteen minutes. The organic layer was then separated, the aqueous layer extracted with ether, and the combined organic extracts were dried over magnesium sulfate. Removal of the solvent in vacuo and distillation of the residual yellow oil in vacuo gave 47.0 g. of 2,2,6,6-tetramethyl-4-heptanone, b.p. 74°–76°C./17 mm.; $n_D^{26} = 1.4181$.

The above ketone (0.28 mole), dissolved in 160 ml. of glacial acetic acid in a 500 ml. three necked flask equipped with a dropping funnel, thermometer, and magnetic stirrer, was treated dropwise over a period of about 2 hours with a solution of 88.3 g. (0.55 mole) of bromine in 160 ml. of glacial acetic acid, while maintaining the temperature below 41°C. When addition was complete, the mixture was stirred an additional half hour, the excess bromine destroyed by addition of aqueous sodium bisulfite, and the light yellow solution was poured into cold water. The yellow solid which separated was collected and recrystallized from methanol to give two crops totaling 73.3 g. of 3,5-dibromo-2,2,6,6-tetramethyl-4-heptanone, m.p. 71°–73C.

A solution of 16.4 g. (0.05 mole) of 3,5-dibromo-2,2,6,6-tetramethyl-4-heptanone in 50 ml. of chloroform was treated with 14.9 g. (0.12 mole) of 1,5-diazabicyclo[4.3.0]non-5-ene (DBN), and the reaction mixture was refluxed with stirring for forty-eight hours. The reaction mixture was cooled to room temperature and treated with an ice/water mixture and excess concentrated hydrochloric acid. The chloroform layer was then separated, the aqueous layer extracted three times with methylene dichloride, and the combined organic extracts were extracted four times with 70 percent sulfuric acid. The sulfuric acid extracts were stirred with about 400 g. of an ice/water mixture, and the mixture was extracted four times with methylene dichloride. Evaporation of the combined organic extracts to dryness afforded 6.0 g. of tan crystals which were distilled in vacuo to give 4.9 g. of 2,3-di-t-butylcyclopropenone, b.p. 117°–130°C./18 mm.; m.p. 62°–64.5°C.(recrystallized from cold hexane).

B. 1-Anilino-2,3-di-t-butylcyclopropenylium tetrafluoroborate

A solution of 14.5 g. (0.087 mole) of 2,3-di-t-butyl-cyclopropenone and 19.8 g. (0.105 mole) of triethyloxonium tetrafluoroborate dissolved in 105 ml. of methylene dichloride was prepared, and the solution containing 1-ethoxy-2,3-di-t-butylcyclopropenylium tetrafluoroborate formed in situ, was treated with 2.79 g. (0.03 mole) of aniline. The reaction mixture was stirred at room temperature for 6 hours after which time the mixture was filtered and the filtrate diluted with 100 ml. of anhydrous ether. The solid which separated was collected and recrystallized from a methylene dichloride/hexane mixture to give 6.7 g. of 1-anilino-2,3-di-t-butylcyclopropenylium tetrafluoroborate, m.p. 181°–182°C.

Similarly, reaction of 3,4-methylenedioxyaniline; 3,4-ethylenedioxyaniline; 3-chloroaniline; 3-bromoaniline; 4-iodoaniline; 4-fluoroaniline; 2,4,6-trimethylaniline; 3,5-dimethoxyaniline; 4-methylmercaptoaniline; or 4-(N,N-dimethylamino)aniline with 1-ethoxy-2,3-di-t-butylcyclopropenylium tetrafluoroborate in methylene dichloride affords 1-(3,4-methylenedioxyphenyl)amino-2,3-di-t-butyl-cyclopropenylium tetrafluoroborate; 1-(3,4-ethylenedioxyphenyl)amino-2,3-di-t-butyl-cyclopropenylium tetrafluoroborate; 1-(3-chlorophenyl)-amino-2,3-di-t-butylcyclopropenylium tetrafluoroborate; 1-(3-bromophenyl)amino-2,3-di-t-butylcyclopropenylium tetrafluoroborate; 1-(4-iodophenyl)amino-2,3-di-t-butylcyclopropenylium tetrafluoroborate; 1-(4-fluorophenyl)amino-2,3-di-t-butylcyclopropenylium tetrafluoroborate; 1-(2,4,6-trimethylphenyl)-amino-2,3-di-t-butylcyclopropenylium tetrafluoroborate; 1-(3,5-dimethoxyphenyl)amino-2,3-di-t-butylcyclopropenylium tetrafluoroborate; 1-(4-methylmercaptophenyl)amino-2,3-di-t-butyl-cyclopropenylium tetrafluoroborate; or 1-[4-(N,N-dimethylamino)phenyl]amino-2,3-di-t-butyl-cyclopropenylium tetrafluoroborate, respectively.

EXAMPLE 2

1-(1-Thiosemicarbazido)-2,3-di-t-butylcyclopropenylium chloride

A solution of 3.32 g. (0.02 mole) of 2,3-di-t-butyl-cyclopropenone and 1.82 g. (0.02 mole) of thiosemicarbazide in 20 ml. of ethanolic hydrogen chloride was refluxed for seven hours, cooled to room temperature, and then diluted with a small amount of diethyl ether. The crystals which separated from the mixture on standing and cooling were collected by filtration and recrystallized from an isopropanol/ether mixture to give 2.25 g. of 1-(1-thiosemicarbazido)-2,3-di-t-butylcyclopropenylium chloride, m.p. 192°–194°C.

Similarly, reaction of semicarbazide with 2,3-di-t-butylcyclopropenone in the presence of methanesulfonic acid affords 1-(1-semicarbazido)-2,3-di-t-butyl-cyclopropenylium methanesulfonate.

EXAMPLE 3

1-(1-Adamantylamino)-2,3-di-t-butyl-cyclopropenylium tetra-fluoroborate was prepared by reaction of 4.53 g. (0.03 mole) of 1-adamantylamine with 0.03 mole of 1-ethoxy-2,3-di-t-butyl-cyclopropenylium tetrafluoroborate in methylene dichloride using the procedure described above in Example 1B. The crude product was recrystallized from isopropanol to give 4.6 g. of 1-(1-adamantylamino)-2,3-di-t-butylcyclopropenylium tetrafluoroborate, m.p. 256°–258°C.

Similarly, reaction of 2-adamantylamine, N-methyl- 1-adamantylamine, N-ethyl-1-adamantylamine, N-methyl-2-adamantylamine, or N-ethyl-2-adamantylamine with 1-ethoxy-2,3-di-t-butylcyclopropenylium tetrafluoroborate in methylene dichloride affords 1-(2-adamantylamino)-2,3-di-t-butylcyclopropenylium tetrafluoroborate, 1-(N-methyl-1-adamantylamino)-2,3-di-t-butylcyclopropenylium tetrafluoroborate, 1-(N-ethyl-1-adamantylamino)-2,3-di-t-butylcyclopropenylium tetrafluoroborate, 1-(N-methyl-2-adamantylamino)-2,3-di-t-butylcyclopropenylium tetrafluoroborate, or 1-(N-ethyl-2-adamantylamino)-2,3-di-t-butylcyclopropenylium tetrafluoroborate, respectively.

EXAMPLE 4

1-Phenyl-2,3-di-t-butylcyclopropenylium tetrafluoroborate

To 47 ml. (0.09 mole) of a 1.91 molar solution of phenyl lithium was added a solution of 4.98 g. (0.03 mole) of 2,3-di-t-butylcyclopropenone in 30 ml. of diethyl ether while cooling the reaction mixture in an ice bath. When addition was complete, the mixture was warmed to room temperature, refluxed for 2 hours, and then cooled and treated with 4 ml. of water. The solid which separated was filtered off, washed with diethyl ether, and the combined filtrates were dried over magnesium sulfate and taken to dryness giving a yellow oil which was dissolved in diethyl ether and treated with a solution of tetrafluoroboric acid in glacial acetic acid/acetic anhydride. The solid which separated was collected by filtration and recrystallized from methylene dichloride to give 3.76 g. of 1-phenyl-2,3-di-t-butylcyclopropenylium tetrafluoroborate, m.p. 260°–262°C.

Reaction of the intermediate carbinol with hydrobromic, hydrochloric, hydriodic, sulfuric, perchloric, p-toluenesulfonic, or methanesulfonic acids affords 1-phenyl-2,3-di-t-butylcyclopropenylium bromide, chloride, iodide, sulfate, perchlorate, p-toluenesulfonate, or methanesulfonate, respectively.

Similarly, reaction of 2,3-di-t-butylcyclopropenone with 3,4-methylenedioxyphenyl magnesium bromide; 3,4-ethylenedioxyphenyl magnesium bromide; 4-chlorophenyl magnesium bromide; 4-fluorophenyl magnesium bromide; 3,4,5-trimethylphenyl magnesium bromide; 2,6-dimethoxyphenyl lithium; 3-methylmercaptophenyl magnesium bromide; or 4-(N,N-dimethylamino)-phenyl magnesium bromide in diethyl ether and reaction of the resulting carbinol with hydrobromic acid affords 1-(3,4-methylenedioxyphenyl)-2,3-di-t-butylcyclopropenylium bromide; 1-(3,4-ethylenedioxyphenyl)-2,3-di-t-butylcyclopropenylium bromide; 1-(4-chlorophenyl)-2,3-di-t-butylcyclopropenylium bromide; 1-(4-fluorophenyl)-2,3-di-t-butylcyclopropenylium bromide; 1-(3,4,5-trimethylphenyl)-2,3-di-t-butylcyclopropenylium bromide; 1-(2,6-dimethoxyphenyl)-2,3-di-t-butylcyclopropenylium bromide; 1-(3-methylmercaptophenyl)-2,3-di-t-butylcyclopropenylium bromide; or 1-[4-(N,N-dimethylamino)phenyl]-2,3-di-t-butylcyclopropenylium bromide, respectively.

EXAMPLE 5

1-t-Butylamino-2,3-di-t-butylcyclopropenylium tetrafluoroborate was prepared by reaction of 2.19 g. (0.03 mole) of t-butylamine with a solution of 0.03 mole of 1-ethoxy-2,3-di-t-butylcyclopropenylium tetrafluoroborate in methylene dichloride using the procedure described above in Example 1B. The product was recrystallized from isopropanol to give 4.58 g. of 1-t-butylamino-2,3-di-t-butylcyclopropenylium tetrafluoroborate, m.p. 205°–207°C.

EXAMPLE 6

1-(2-Phenyl-1-hydrazino)-2,3-di-t-butylcyclopropenylium tetrafluoroborate was prepared by reaction of 2.16 g. (0.02 mole) of phenylhydrazine with a solution of 0.02 mole of 1-ethoxy-2,3-di-t-butylcyclopropenylium tetrafluoroborate in methylene dichloride using the procedure described above in Example 1B. The product was recrystallized from isopropanol/ether to give 3.39 g. of 1-(2-phenyl-1-hydrazino)-2,3-di-t-butylcyclopropenylium tetrafluoroborate, m.p. 141°–143°C.

EXAMPLE 7

1-(2-Phenethyl)amino-2,3-di-t-butylcyclopropenylium tetrafluoroborate was prepared by reaction of 2.42 g. (0.02 mole) of phenethylamine with a solution of 0.02 mole of 1-ethoxy-2,3-di-t-butylcyclopropenylium tetrafluoroborate in methylene dichloride using the procedure described above in Example 1B. The product was recrystallized from isopropanol/diethyl ether to give 5.09 g. of 1-(2-phenethyl)amino-2,3-di-t-butylcyclopropenylium tetrafluoroborate, m.p. 121°–122.5°C.

Similarly, reaction of 1-ethoxy-2,3-di-t-butylcyclopropenylium tetrafluoroborate with benzylamine; 2-(3,4-methylenedioxyphenyl)ethylamine; 2-(3,4-ethylenedioxyphenyl)-ethylamine; 2-(4-chlorophenyl)ethylamine; 2-(4-bromophenyl)-ethylamine; 2-(4-iodophenyl)ethylamine; 2-(4-fluorophenyl)-ethylamine; 2-(3,4,5-trimethylphenyl)ethylamine; 2-(2,6-dimethoxyphenyl)ethylamine; 2-(4-methylmercaptophenyl)-ethylamine; or 2-[4-(N,N-dimethylamino)phenyl]ethylamine in methylene dichloride affords 1-benzylamino-2,3-di-t-butylcyclopropenylium tetrafluoroborate; 1-[2-(3,4-methylenedioxyphenyl)ethylamino]-2,3-di-t-butylcyclopropenylium tetrafluoroborate; 1-[2-(3,4-ethylenedioxyphenyl)ethylaminoit-2,3-di-t-butylcyclopropenylium tetrafluoroborate; 1-[2-(4-chlorophenyl)-ethylamino]-2,3-di-t-butylcyclopropenylium tetrafluoroborate; 1-[2-(4-bromophenyl)ethylamino]-2,3-di-t-butylcyclopropenylium tetrafluoroborate; 1-[2-(4-iodophenyl)ethylamino]-2,3-di-t-butylcyclopropenylium tetrafluoroborate; 1-[2-(4-fluorophenyl)-ethylamino]-2,3-di-t-butylcyclopropenylium tetrafluoroborate; 1-[2-(3,4,5-trimethylphenyl)ethylamino]-2,3-di-t-butylcyclopropenylium tetrafluoroborate; 1-[2-(2,6-dimethoxyphenyl)-ethylamino]-2,3-di-t-butylcyclopropenylium tetrafluoroborate; 1-[2-(4-methylmercaptophenyl)ethylamino]-2,3-di-t-butylcyclopropenylium tetrafluoroborate; or 1-{2-[4-(N,N-dimethylamino)phenyl]ethylamino}-2,3-di-t-butylcyclopropenylium tetrafluoroborate, respectively.

EXAMPLE 8

1-Dimethylamino-2,3-di-t-butylcyclopropenylium tetrafluoroborate was prepared by reaction of 4 ml. (0.06 mole) of dimethylamine dissolved in 5 ml. of cold methylene dichloride with 0.06 mole of a solution of 1-ethoxy-2,3-di-t-butylcyclopropenylium tetrafluoroborate in methylene dichloride using the procedure described above in Example 1B. The product was recrystallized once from acetone/ether and once from isopropanol to give 2.4 g. of 1-dimethylamino-2,3-di-t-cyclopropenylium tetrafluoroborate, m.p. 161°–163°C.

EXAMPLE 9

1-Amino-2,3-di-t-butylcyclopropenylium tetrafluoroborate was prepared by passing a stream of anhydrous ammonia through a solution of 0.065 mole of 1-ethoxy-2,3-di-t-butylcyclopropenylium tetrafluoroborate in methylene dichloride with stirring for forty-five minutes. The product was recrystallized once from acetone/ether and once from isopropanol to give 11.3g. of 1-amino-2,3-di-t-butylcyclopropenylium tetrafluoroborate, m.p. 236°–238°C.

EXAMPLE 10

A. 1-(1-adamantyl)-4,4-dimethyl-2-pentanone was prepared by reaction of neopentyl magnesium chloride [prepared from 6.6 g. (0.025 g. atom) of magnesium and 23 g. (0.20 mole) of neopentyl chloride in 100 ml. of ether] with 42 g. (0.20 mole) of 1-adamantylacetyl chloride using the procedure described above in Example 1A. The product was purified by distillation to give 43.9 g. of 1-(1-adamantyl)-4,4-dimethyl-2-pentanone, b.p. 130°–132°C./0.5 mm., m.p. 78°–80°C.

B. 2-(1-Adamantyl)-3-t-butylcyclopropenone was prepared by bromination of 40 g. (0.16 mole) of 1-(1-adamantyl)-4,4-dimethyl-2-pentanone with 5.5 g. (0.345 mole) of bromine in 240 ml. of glacial acetic acid and cyclization of 48.8 g. (0.12 mole) of the resulting 1-(1-adamantyl)-1,3-dibromo-4,4-dimethyl-2-pentanone (54 g., m.p. 111°–113°C.) with 44 g. (0.29 mole) of DBU all according to the procedure described above in Example 1B. There was thus obtained 24 g. of crude material which, after recrystallization, gave 20.2 g. of 2-(1-adamantyl)-3-t-butylcyclopropenone, m.p. 133°–135°C.

C. 1-(1-Adamantylamino)-2-(1-adamantyl)-3-t-butylcyclopropenylium tetrafluoroborate.

A solution of 13.4 g. (0.055 mole) of 2-(1-adamantyl)-3-t-butylcyclopropenone and 13.6 g. (0.071 mole) of triethyloxonium tetrafluoroborate dissolved in 100 ml. of methylene dichloride was prepared, and the solution containing 1-ethoxy-2-(1-adamantyl)-3-t-butylcyclopropenylium tetrafluoroborate formed in situ was treated with 3.33 g. (0.02 mole) of 1-adamantylamine using the procedure described above in Example 1B. The product was recrystallized from isopropanol to give 5.48 g. of 1-(1-adamantylamino)-2-(1-adamantyl)-3-t-butylcyclopropenylium tetrafluoroborate, m.p. 269°–273°C.

EXAMPLE 11

1-(1-Adamantyl)-2,3-di-t-butylcyclopropenylium tetrafluoroborate was prepared by reaction of 6.5 g. (0.026 mole) of 2-(1-adamantyl)-3-t-butylcyclopropenone, dissolved in 50 ml. of benzene, with 0.053 mole of a solution of t-butyl lithium in pentane, and reaction of the resulting carbinol dissolved in 250 ml. of ether with a solution of tetrafluoroboric acid in glacial acetic acid/acetic anhydride all according to the procedure described above in Example 4. The product was recrystallized from ether to give 3.5 g. of 1-(1-adamantyl)-2,3-di-t-butylcyclopropenylium tetrafluoroborate, m.p. 286°–288°C.

Similarly, reaction of 2-(1-adamantyl)-3-t-butylcyclopropenone with 1-adamantylmethyl magnesium bromide or 2-(1-adamantyl)ethyl magnesium bromide and reaction of the resulting carbinol with p-toluenesulfonic acid affords 1-(1-adamantylmethyl)-2-(1-adamantyl)-3-t-butylcyclopropenylium p-toluenesulfonate or 1-[2-(1-adamantyl)ethyl]-2-(1-adamantyl)-3-t-butylcyclopropenylium p-toluenesulfonate, respectively.

EXAMPLE 12

1-(2-Phenylethyl)amino-2-(1-adamantyl)-3-t-butylcyclopropenylium tetrafluoroborate was prepared by reaction of 2.67 g. (0.02 mole) of 2-phenethylamine with 0.02 mole of a solution of 1-ethoxy-2-(1-adamantyl)-3-t-butylcyclopropenylium tetrafluoroborate in methylene dichloride using the procedure described above in Example 1B. The product was recrystallized from isopropanol to give 1.2 g. of 1-(2-phenylethyl)amino-2-(1-adamantyl)-3-t-butylcyclopropenylium tetrafluoroborate, m.p. 164°–165°C.

EXAMPLE 13

A. 1,3-Di-(1-adamantyl)-2-propanone was prepared by reaction of 1-adamantylmethyl magnesium chloride [prepared from 3.3 g. (0.017 mole) of 1-adamantylmethyl chloride with 0.96 g. (0.04 g. atom) of magnesium in 25 ml. of absolute ether] with 3.2 g. (0.015 mole) of 1-adamantylacetyl chloride using the procedure described above in Example 1A. The product was recrystallized from absolute ethanol to give 4.0 g. of 1,3-di-(1-adamantyl)-2-propanone, m.p. 235°–249°C.

B. 2,3-Di-(1-adamantyl)cyclopropenone was prepared by bromination of 20.6 g. (0.08 mole) of 1,3-di-(1-adamantyl)-2-propanone dissolved in 200 ml. of glacial acetic acid with 25.9 g. (0.16 mole) of bromine in 20 ml. of glacial acetic acid, and cyclization of 14.5 g. (0.03 mole) of the resulting 1,3-di-(1-adamantyl)-1,3-dibromo-2-propanone (38.6 g., recrystallized from ethyl acetate, m.p. 199°–209°C.) with 15.2 g. (0.10 mole) of DBU in 110 ml. of chloroform all according to the procedure described above in Example 1A. The product was recrystallized once from ethyl acetate and once from ethanol to give 4.24 g. of 2,3-di-(1-adamantyl)-cyclopropenone.

C. 1-[2-(Benzyloxy)ethylamino]-2,3-di-(1-adamantyl)cyclopropenylium tetrafluoroborate A solution of about 8.1 g. (0.025 mole) of 2,3-di-(1-adamantyl)cyclopropenone and 5.7 g. (0.03 mole) of triethyloxonium tetrafluoroborate dissolved in 50 ml. of methylene dichloride was prepared, and the solution containing 1-ethoxy-2,3-di-(1-adamantyl)cyclopropenylium tetrafluoroborate formed in situ was treated with 3.78 g. (0.025 mole) of 2-(benzyloxy)ethylamine using the procedure described above in Example 1B. The product was recrystallized from isopropanol to give 6.7 g. of 1-[2-(benzyloxy)ethylamino]-2,3-di-(1-adamantyl)cyclopropenylium tetrafluoroborate, m.p. 168°–172.5°C.

EXAMPLE 14

1-(1-Adamantylamino)-2,3-di-(1-adamantyl)cyclopropenylium tetrafluoroborate was prepared by reaction of 1.51 g. (0.01 mole) of 1-adamantylamine with a solution containing 0.12 mole of 1-ethoxy-2,3-di-(1-adamantyl)cyclopropenylium tetrafluoroborate in methylene dichloride using the procedure described above in Example 1B. The product was recrystallized from isopropanol to give 2.1 g. of 1-(1-adamantylamino)-2,3-di-(1-adamantyl)cyclopropenylium tetrafluoroborate, m.p. >350°C.

EXAMPLE 15

1-Cyclopropylamino-2,3-di-(1-adamantyl)cyclopropenylium tetrafluoroborate was prepared by reaction of 0.86 g. (0.015 mole) of cyclopropylamine with a solution containing 0.015 mole of 1-ethoxy-2,3-di-(1-adamantyl)cyclopropenylium tetrafluoroborate in methylene dichloride using the procedure described above in Example 1B. The product was recrystallized from isopropanol to give 3.8 g. of 1-cyclopropylamino-2,3di-(1-adamantyl)-cyclopropenylium tetrafluoroborate, m.p. 267°–280°C.

Similarly, reaction of 1-ethoxy-2,3-di-(1-adamantyl)-cyclopropenylium tetrafluoroborate with cyclobutylamine, cyclopentylamine, cyclohexylamine, or cycloheptylamine in methylene dichloride affords 1-cyclobutylamino-2,3-di-(1-adamantyl)cyclopropenylium tetrafluoroborate; 1-cyclopentylamino-2,3-di-(1-adamantyl)cyclopropenylium tetrafluoroborate; 1-cyclohexylamino-2,3-di-(1-adamantyl)cyclopropenylium tetrafluoroborate; or 1-cycloheptylamino-2,3-di-(1-adamantyl)-cyclopropenylium tetrafluoroborate respectively.

EXAMPLE 16

1-(1-Pyrrolidinyl)-2,3-di-(1-adamantyl)cyclopropenylium tetrafluoroborate was prepared by reaction of 0.6 g. (0.008 mole) of pyrrolidine with a solution containing 0.01 mole of 1-ethoxy-2,3-di-(1-adamantyl)cyclopropenylium tetrafluoroborate in methylene dichloride using the procedure described above in Example 1B. The product was recrystallized from isopropanol to give 2.2 g. of 1-(1-pyrrolidinyl)-2,3-di-(1-adamantyl)cyclopropenylium tetrafluoroborate, m.p. 290°–302°C.

Similarly, reaction of 1-ethoxy-2,3-di-(1-adamantyl)-cyclopropenylium tetrafluoroborate with aziridine, azetidine, piperidine, hexamethyleneimine, or morpholine in methylene dichloride affords 1-(1-aziridino)-2,3-di-(1-adamantyl)-cyclopropenylium tetrafluoroborate; 1-(1-azetidino)-2,3-di-(1-adamantyl)cyclopropenylium tetrafluoroborate; 1-(1-piperidino)-2,3-di-(1-adamantyl)cyclopropenylium tetrafluoroborate; 1-(1-hexamethyleneimino)-2,3-di-(1-adamantyl)-cyclopropenylium tetrafluoroborate; or 1-(1-morpholino)-2,3-di-(1-adamantyl)cyclopropenylium tetrafluoroborate, respectively.

EXAMPLE 17

1-Ethylamino-2,3-di-(1-adamantyl)cyclopropenylium tetrafluoroborate was prepared by reaction of 0.41 g. (0.009 mole) of ethylamine with a solution containing 0.01 mole of 1-ethoxy-2,3-di-(1-adamantyl)cyclopropenylium tetrafluoroborate in methylene dichloride using the procedure described above in Example 1B. The product was recrystallized from isopropanol to give 1.6 g. of 1-ethylamino-2,3-di-(1-adamantyl)cyclopropenylium tetrafluoroborate, m.p. 242°–260°C.

EXAMPLE 18

1-Diethylamino-2,3-di-(1-adamantyl)cyclopropenylium tetrafluoroborate was prepared by reaction of 0.64 g. (0.009 mole) of diethylamine with a solution containing 0.01 mole of 1-ethoxy-2,3-di-(1-adamantyl)cyclopropenylium tetrafluoroborate in methylene dichloride using the procedure described above in Example 1B. The product was recrystallized from isopropanol to give 1.8 g. of 1-diethylamino-2,3-di-(1-adamantyl)cyclopropenylium tetrafluoroborate, m.p. 240°–252°C.

EXAMPLE 19

1-Amino-2,3-di-(1-adamantyl)cyclopropenylium tetrafluoroborate was prepared by passing a stream of anhydrous ammonia into a solution containing 0.01 mole of 1-ethoxy-2,3-di-(1-adamantyl)-cyclopropenylium tetrafluoroborate in methylene dichloride using the procedure described above in Example 1B. The product was recrystallized once from isopropanol and twice from ethanol to give 1.06 g. of 1-amino-2,3-di-(1-adamantyl)-cyclopropenylium tetrafluoroborate, m.p. 297°–312°C.

EXAMPLE 20

1-(1-Thiosemicarbazido)-2,3-di-(1-adamantyl)cyclopropenylium chloride was prepared by reaction of 4.83 g. (0.015 mole) of 2,3-di-(1-adamantyl)cyclopropenone with 1.50 g. (0.17 mole) of thiosemicarbazide in a solution of 45 ml. of ethanolic hydrogen chloride and 15 ml. of absolute ethanol using the procedure described above in Example 2. The product was recrystallized once from ethanol and once from ethanol/ether to give 3.4 g. of 1-(1-thiosemicarbazido)-2,3-di-(1-adamantyl)cyclopropenylium chloride, m.p. 231°–240°C.

EXAMPLE 21

1,2,3-Tri-t-butyl-2-cyclopropenyl-1-methylamine hydrochloride

To 100 ml. of a solution containing 0.2 mole of t-butyl lithium in pentane was added a solution of 24.9 g. (0.15 mole) of 2,3-di-t-butylcyclopropenone in 150 ml. of dry benzene. The mixture was stirred at room temperature for five hours, then quenched with water, and the solid which separated was dissolved by addition of more water. Separation of the layers, extraction of the aqueous layer with diethyl ether, and evaporation of the solvent from the combined extracts afforded an oil, which was dissolved in ether and treated with a solution of tetrafluoroboric acid in glacial acetic acid/acetic anhydride. The crystals which separated were collected by filtration and recrystallized from methylene dichloride/hexane to give 28.6 g. of 1,2,3-tri-t-butyl-cyclopropenylium tetrafluoroborate.

The latter (13.2 g., 0.04 mole) was dissolved in 120 ml. of dry acetonitrile, 18.9 g. (0.29 mole) of potassium cyanide was added, and the mixture was heated and stirred under reflux overnight. The mixture was then filtered, the solid filter washed with acetonitrile and ether, and the filtrate taken to dryness giving 5.05 g. of 1,2,3-tri-t-butyl-2-cyclopropene-1-carbonitrile as a liquid which solidified on standing (m.p. 30°–32°C.).

The latter (12 g., 0.05 mole), dissolved in 60 ml. of tetrahydrofuran, was added dropwise with stirring to a suspension of 3.90 g. (0.10 mole) of lithim aluminum hydride in 60 ml. of tetrahydrofuran. When addition was complete, the mixture was refluxed for an additional 5½ hours, then cooled, quenched with wet tetrahydrofuran, filtered, and the solid filter washed with tetrahydrofuran and diethyl ether. The combined filtrates were dried over magnesium sulfate, evaporated to dryness, and the residue taken up in diethyl ether and treated with excess ethereal hydrogen chloride. The solid which separated was collected to give 5.7 g. of 1,2,3-tri-t-butyl-2-cyclopropenyl-1-methylamine hydrochloride, m.p. 285°–287°C.

EXAMPLE 22

N-(2,3-Di-t-butyl-2-cyclopropen-1-ylidene)-p-toluenesulfonamide

To a solution of 3.32 g. (0.02 mole) of 2,3-di-t-butyl-cyclopropenone in 20 ml. of dry methylene dichloride was added dropwise 3.94 g. (0.02 mole) of p-toluenesulfonyl isocyanate. The mixture was then stirred at room temperature for two hours and then taken to dryness in vacuo leaving a residue of while crystals which were recrystallized twice from methylene dichloride/hexane to give 4.27 g. of N-(2,3-di-t-butyl-2-cyclopropen-1-ylidene)-p-toluenesulfonamide, m.p. 114°–116°C.

I claim:

1. A compound having the formula

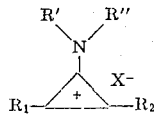

where $R_1$ and $R_2$ are each t-butyl or 1-adamantyl; R' and R'' are each hydrogen or lower-alkyl, or R' is hydrogen and R'' is lower-alkyl, phenyl, phenyl-lower-alkyl, 1- or 2-adamantyl, 2-benzyloxyethyl, cycloalkyl, carbamyl, thiocarbamyl, or phenylamino, or R' is lower-alkyl and R'' is 1- or 2-adamantyl; $X^-$ is an anion of a strong acid, and wherein the phenyl-bearing groups represented by R'' are either unsubstituted or are substituted by methylenedioxy or ethylenedioxy or by from one to three members of the group consisting of halogen, lower-alkyl, lower-alkoxy, lower-alkylmercapto, or di-lower-alkylamino.

2. A compound according to claim 1 wherein $R_1$ and $R_2$ are each t-butyl.

3. A compound according to claim 1 wherein $R_1$ and $R_2$ are each 1-adamantyl.

4. A compound according to claim 1 wherein $R_1$ is t-butyl and $R_2$ is 1-adamantyl.

5. 1-(2-Phenyl-1-hydrazino)-2,3-di-t-butylcyclopropenylium tetrafluoroborate according to claim 2 where R' is hydrogen, R'' is phenylamino, and $X^-$ is tetrafluoroborate.

6. 1-[2-(Benzyloxy)ethylamino]-2,3-di-(1-adamantyl)-cyclopropenylium tetrafluoroborate according to claim 3 where R' is hydrogen, R'' is 2-benzyloxyethyl, and $X^-$ is tetrafluoroborate.

7. 1-(1-Adamantylamino)-2,3-di-(1-adamantyl)-cyclopropenylium tetrafluoroborate according to claim 3 where R' is hydrogen, R'' is 1-adamantyl, and $X^-$ is tetrafluoroborate.

8. 1-Cyclopropylamino-2,3-di-(1-adamantyl)-cyclopropenylium tetrafluoroborate according to claim 3 where R' is hydrogen, R'' is cyclopropyl, and $X^-$ is tetrafluoroborate.

9. 1-Ethylamino-2,3-di-(1-adamantyl)cyclopropenylium tetrafluoroborate according to claim 3 where R' is hydrogen, R'' is ethyl, and $X^-$ is tetrafluoroborate.

10. 1-Diethylamino-2,3-di-(1-adamantyl)cyclopropenylium tetrafluoroborate according to claim 3 where R' and R'' are each ethyl, and $X^-$ is tetrafluoroborate.

11. 1-Amino-2,3-di-(1-adamantyl)cyclopropenylium tetrafluoroborate according to claim 3 where R' and R'' are each hydrogen, and $X^-$ is tetrafluoroborate.

12. 1-(1-Adamantylamino)-2-(1-adamantyl)-3-t-butyl-cyclopropenylium tetrafluoroborate according to claim 4 where R' is hydrogen, R'' is 1-adamantyl, and $X^-$ is tetrafluoroborate.

13. 1-(2-Phenylethyl)amino-2-(1-adamantyl)-3-t-butylcyclopropenylium tetrafluoroborate according to claim 4 where R' is hydrogen, R'' is 2-phenylethyl, and $X^-$ is tetrafluoroborate.

* * * * *